United States Patent
Fox et al.

(10) Patent No.: US 8,083,978 B1
(45) Date of Patent: Dec. 27, 2011

(54) LID CLOSER FOR INJECTION MOLD

(75) Inventors: Roger L Fox, Webster, NY (US);
Terrance A Fox, Spencerport, NY (US);
Donald H Hickel, Jr., Scottsville, NY (US)

(73) Assignee: Accede Mold & Tool, Inc., Rochester, NY (US)

( * ) Notice: Subject to any disclaimer, the term of this patent is extended or adjusted under 35 U.S.C. 154(b) by 0 days.

(21) Appl. No.: 12/907,540

(22) Filed: Oct. 19, 2010

(51) Int. Cl.
*B29C 45/40* (2006.01)

(52) U.S. Cl. .......... 264/238; 264/334; 425/441; 425/556

(58) Field of Classification Search .................. 264/238, 264/334, 336; 425/441, 442, 444, 556, 436 R, 425/436 RM; 249/58, 161
See application file for complete search history.

(56) References Cited

U.S. PATENT DOCUMENTS

| | | | |
|---|---|---|---|
| 4,040,595 A * | 8/1977 | Tecco | 249/68 |
| 4,340,352 A * | 7/1982 | Hayberg | 425/517 |
| 4,818,208 A | 4/1989 | Byrne | |
| 5,037,597 A | 8/1991 | McGinley et al. | |
| 5,709,833 A | 1/1998 | Simone | |
| 5,906,841 A | 5/1999 | Bak | |
| 7,168,149 B2 | 1/2007 | Kalemba et al. | |
| 7,291,305 B2 * | 11/2007 | Vanderploeg et al. | 264/334 |
| 7,427,196 B2 * | 9/2008 | Kalemba et al. | 425/517 |
| 7,470,387 B2 | 12/2008 | Chiu | |
| 2008/0260890 A1 * | 10/2008 | Di Simone | 425/556 |

* cited by examiner

*Primary Examiner* — Jill Heitbrink
(74) *Attorney, Agent, or Firm* — Eugene S. Stephens, PC (57) ABSTRACT

Injection molded parts having bodies and lids connected by living hinges have the lids closed against the bodies during an opening sequence of mold plates. The lid closing mechanism is arranged in an intermediate plate disposed between a movable B plate and a fixed A plate. Movable and fixed cavities can meet within the intervening plate where a lid closer accomplishes lid closing as mold plates separate during mold opening. Accomplishing the lid closure during a mold opening sequence avoids any increase in the mold cycle time.

20 Claims, 7 Drawing Sheets

LID CLOSER FOR INJECTION MOLD

TECHNICAL FIELD

Closing living hinge lids of injection molded parts

BACKGROUND

Closing the lids of injection molded parts having bodies and lids connected by a living hinge has been problematic. Previous solutions have proposed that the lids be closed to the bodies after the mold opens. This involves reaching into the open mold space with something to move the lids closed, which adds costly seconds to the mold cycle time. Another solution has been to eject the parts into a machine that closes the lids outside the mold. This does not add to mold cycle time, but it adds expensive additional equipment for handling the ejected parts. Solutions have also included separately powered arms or devices to reach into the space available in an open mold to remove parts or close lids. This requires accurate timing and sensing of locations so that components of the mold do not crash into each other.

SUMMARY

The solution reached by this invention accomplishes lid closure during the opening movements of the mold plates without adding any time to the molding cycle. It also accomplishes lid closing by deriving the necessary movements from the moving mold plates themselves so that no additional power source or sensing systems are required. Since parts with closable lids are manufactured in huge numbers, accomplishing lid closure without increasing mold cycle time is highly valued. Also, accomplishing lid closure during opening movement of the mold plates, without requiring any additional machinery to close the lids of molded parts, saves much of the expense that previous solutions suffered.

The invention adds to a conventional mold an additional X plate between a fixed A plate and a movable B plate. The intervening X plate holds a lid closing assembly while allowing an A cavity and a B cavity to meet within the intervening X plate. Then as a support for the B plate begins an initial movement of an opening sequence, a core that forms a back or top side of the lid is removed from behind the lids. At the same time, a lid closer mounted in the intervening X plate is raised into the position behind the lids that the removed core previously occupied. In a subsequent move of opening mold plates, the B cavity and the X plate separate from the A cavity while the B cavity holds the bases of the molded parts. This movement pivots the lid closer through an arc that closes the lids as this mold opening sequence progresses. By the time that the mold plates are fully opened, the lids have been closed, and the parts are ejected without requiring any additional operation. Significantly, the lid closing process is accomplished within the normal opening time for the mold plates without adding any time to the molding cycle. When the mold recloses, the motions of all the moving components are reversed to bring the mold back to a closed relationship where the mold can be shot again.

DETAILED DESCRIPTION

The illustrations are schematic and eliminate many details necessary to a mold, but unnecessary for understanding the invention. Persons skilled in the art of injection molding will understand the details that must be added to make a mold successful and workable. The following description assumes up, down, forward, and back motions typical of an injection mold, but the reader should understand that molds and movements can be oriented in different ways and that these expressions are for convenience only.

Figure 1:
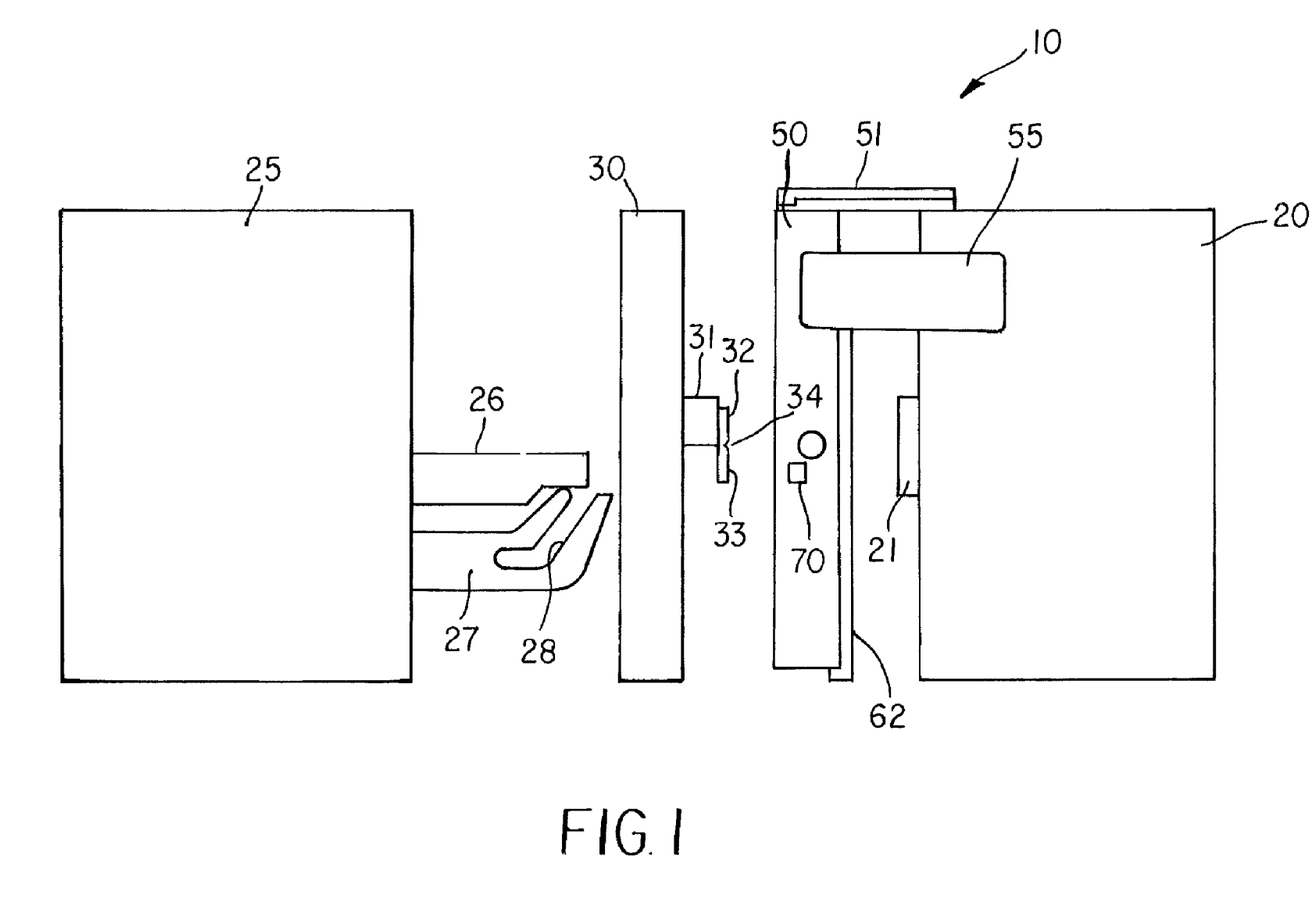
FIG. 1 is an exploded schematic view of a preferred embodiment of mold plates capable of closing lids according to the invention.

Beginning with the exploded view of FIG. 1, a mold according to the invention includes a fixed A plate 20, a movable B plate support 25, a B plate 30, and an intervening X plate 50. The B plate includes a movable cavity 31 for a body portion 32 of a molded part that includes a lid 33 joined to base 32 by a living hinge 34. A core 26 on the B support plate 25 serves as a portion of the B mold by forming the back or top side of lid 33. The movable B cavity 31 meets the fixed A cavity 20 within the intervening X plate 50, which carries a lid closer 70. Ordinarily, a mold will have many A and B cavities arranged in rows and columns, but for simplicity of illustration the drawings show only a single row of 2 cavities.

When the exploded plates of FIG. 1 are moved to closed positions, they abut each other, with the movable cavity 31 meeting the fixed cavity 21 within the intervening X plate 50. In this position, lid closer 70 is located below lids 33 and is aligned with a space behind lids 33. This space, in the closed mold position, is occupied by core 26. The mold is then ready to be shot to produce bodies 32 with lids 33 and living hinges 34.

Figure 2:
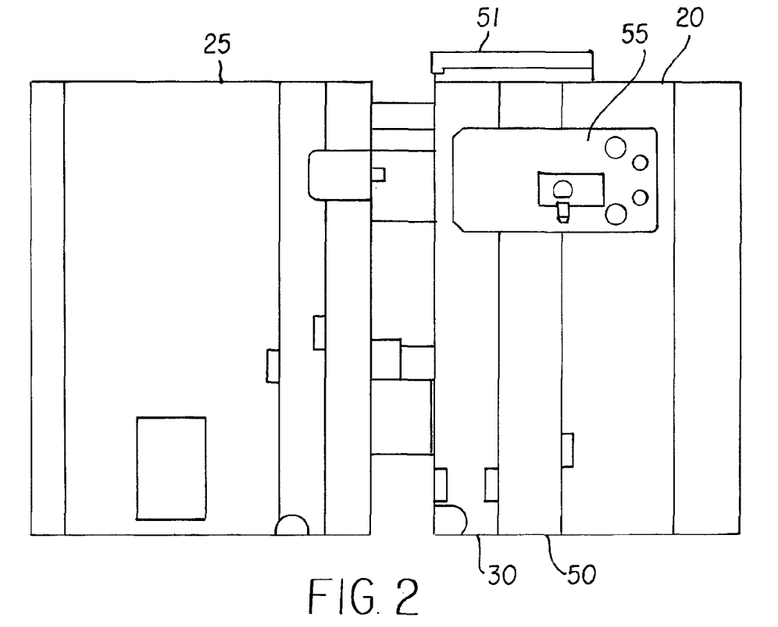
FIG. 2 is a schematic view of a first opening split between the mold plates occurring during an initial opening movement of the mold parts.

After the cavities of a mold are shot, and the mold is ready to be opened, the initial movement in an opening sequence is movement of the B support plate away from the B plate, as illustrated in FIG. 2. The core 26 that is attached to the B support plate is thus withdrawn during the initial movement. This moves core 26 away from behind lids 33, which are preferably arranged in rows within mold 10. This initial opening movement also moves cam 27 with its fork-shaped angled slot 28, as shown in FIG. 1.

Figure 11:
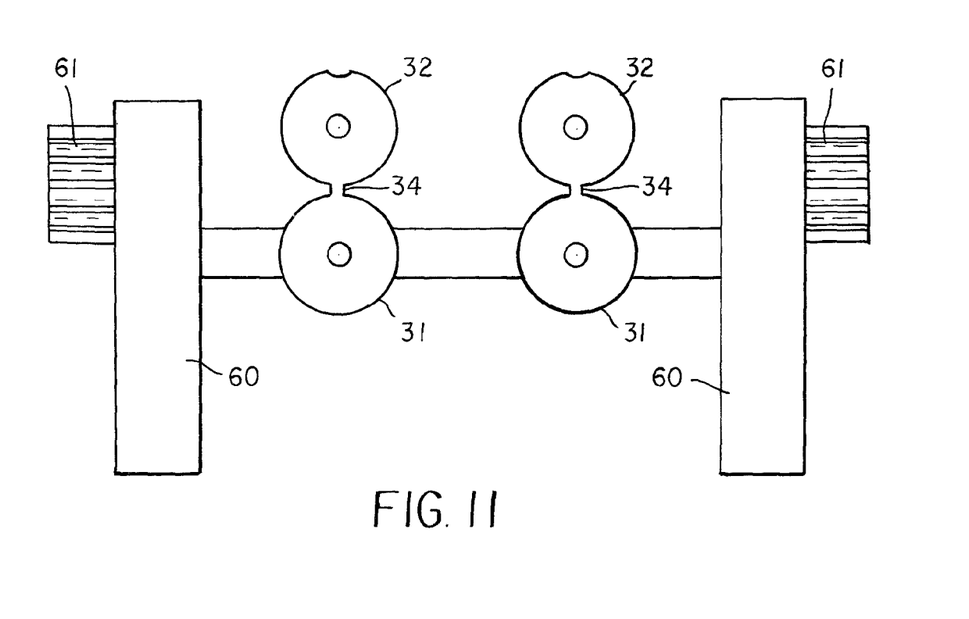
FIG. 11 schematically illustrates an aligned pair of molded parts with a lid closer behind the lids where it is ready to rotate the lids to a closed position when the illustrated pinions are rotated.

Lid closer 70, which has a bar shape that can extend along a row of lids 33, as shown in FIG. 11, has end regions that engage slots 28 of a pair of cam forks 27. The withdrawal of cam forks 27 with the movement of the B support plate 25 causes lid closer 70 to move up behind lids 33 into the space previously occupied by core 26.

Figure 5:
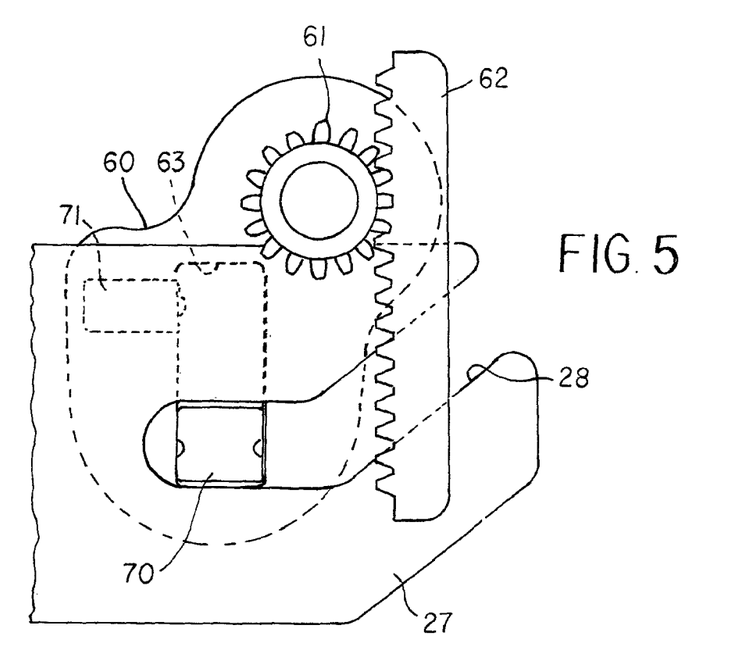
FIG. 5 is a schematic view of a cam mechanism for moving a lid closer into a position behind lids as a core is retracted from such a behind the lids position.
Figure 6:
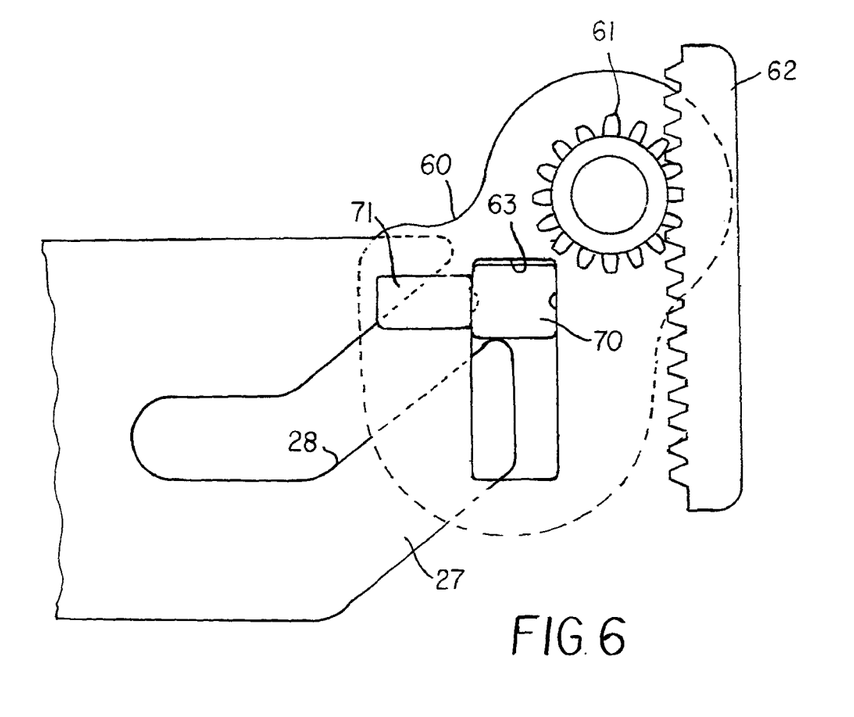
FIG. 6 is a schematic view showing movement of the cam system of FIG. 5 to a position elevating a lid closer into a behind-the-lids position.

This upward movement of lid closer 70 is best shown in FIGS. 5 and 6. Before any movement of B support plate 25, lid closer 70 is in the position shown in FIG. 5 where its ends are near the closed end of slot 28. Lid closer 70 is also constrained to move only vertically by a slot 63 in pivoter 60 that allows only vertical movement of lid closer 70. Pivoter 60 is attached to a pinion 61 driven by a rack 62.

As fork cam 27 withdraws with core 26 and B support plate 25, lid closer 70 is forced upward by slot 28 and is allowed to move only vertically by pivoter slot 63 to the position shown in FIG. 6. When lid closer 70 reaches this position at the top of its vertical travel, it is held in place by detent 71. By this time, forks 27 have moved clear of lid closer 70 and pivoter 60. This positions lid closer 70 in the now empty space behind lids 33, as shown in FIG. 11. Lid closer 70 is then in position to close and latch lids 33 against bodies 32.

Figure 3:
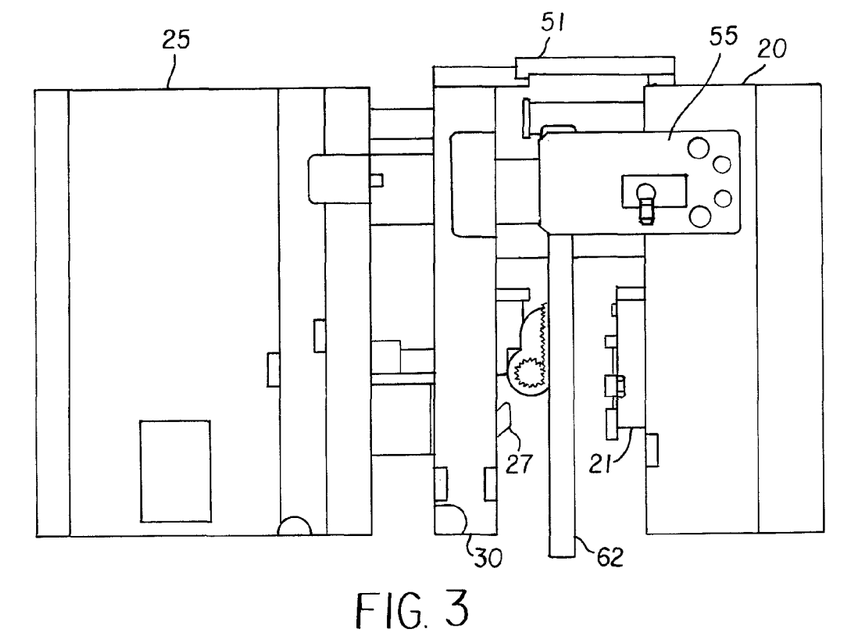
FIG. 3 is a schematic view of a second split of the mold plates, with an intervening plate omitted for convenience of illustration.
Figure 4:
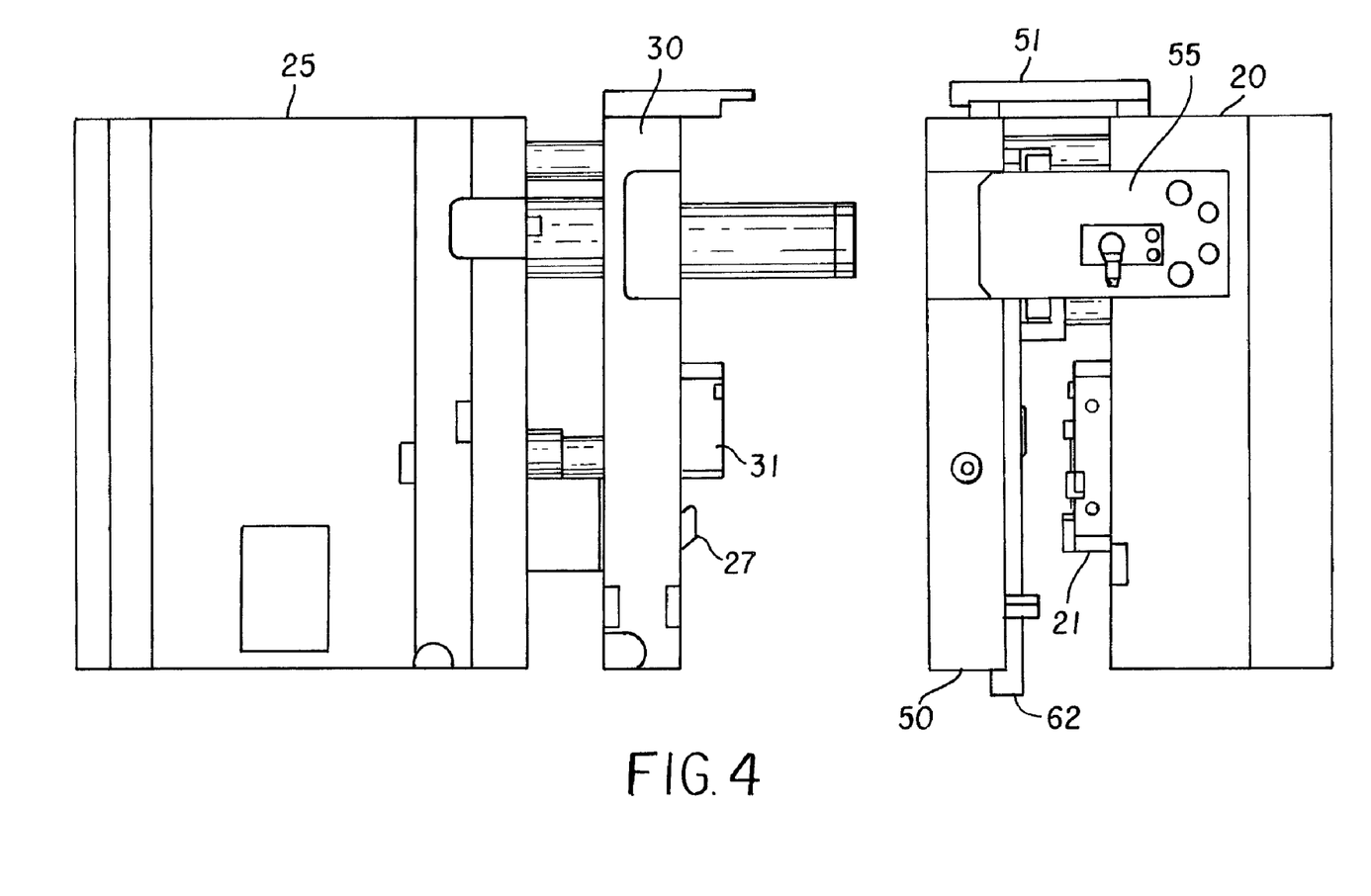
FIG. 4 is a schematic view of a fully opened mold allowing ejection of the closed lid parts.

The next movement in the mold opening sequence moves intervening X plate 50 away from fixed A plate 20. X plate 50 remains engaged with B plate 30, which also holds the molded parts in its cavities 31. The movement results in a gap where molded parts have departed from fixed cavity 21 in A plate 20, as shown in FIG. 3, where X plate 50 has been removed to reveal the lid closing assembly. The moved X plate 50 reappears in FIG. 4 where it is spaced from A plate 20. Plate 50 is limited in opening travel by latch 51 that keeps plate 50 connected with A plate 20, even when open, as shown in FIG. 4.

Figure 7:
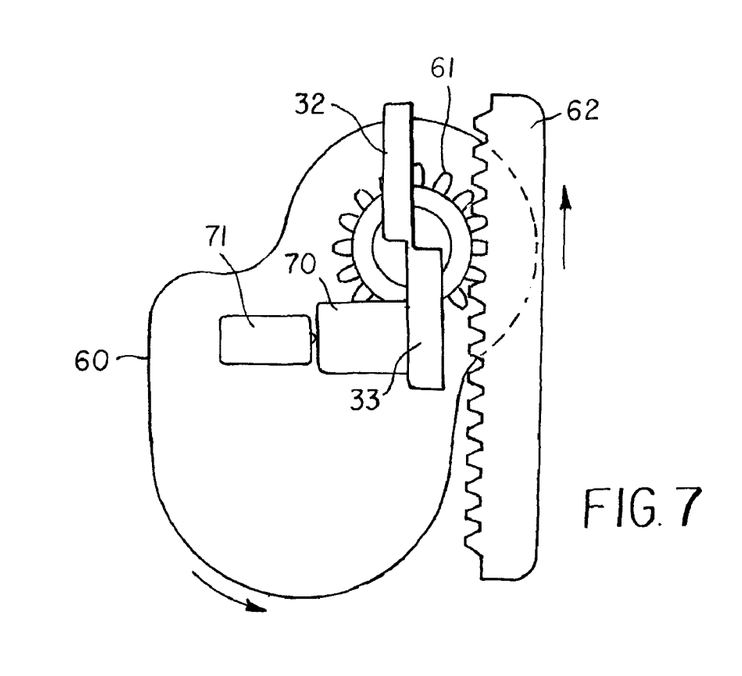
FIGS. 7 and 8 are similar schematic views of a rack and pinion arrangement for pivoting a lid closer from the starting position shown in FIG. 7 through an arc to the lid closing position shown in FIG. 8.
Figure 8:
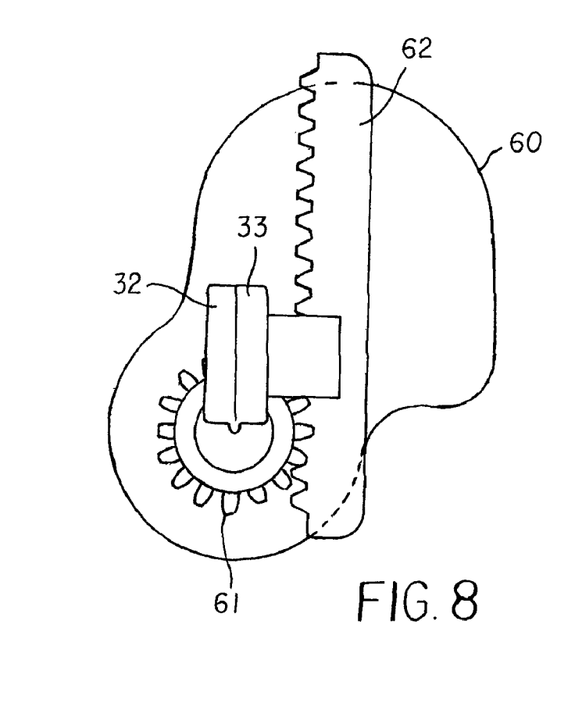
Figure 9:
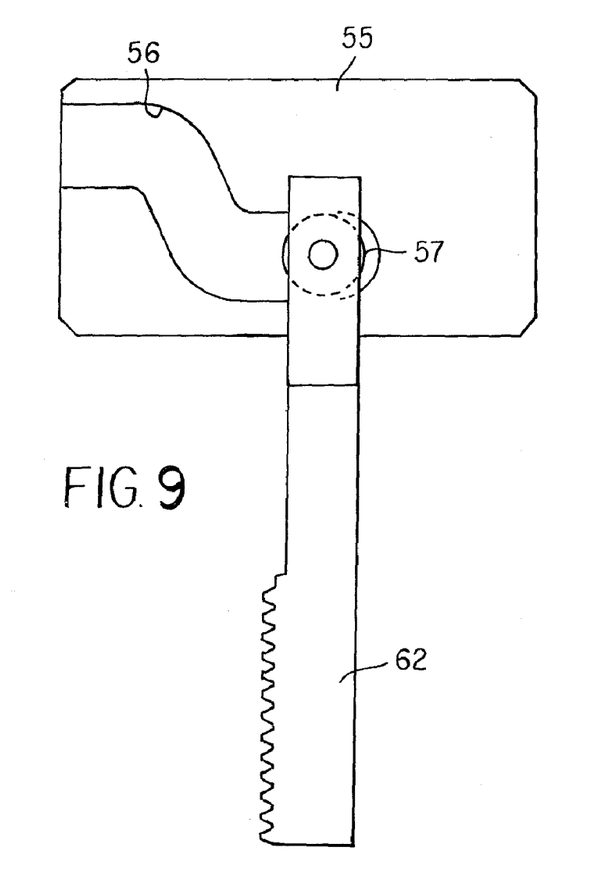
FIGS. 9 and 10 are similar schematic views of a cam arrangement driving a rack that rotates the pinion of FIGS. 7 and 8 to pivot a lid closer through a closing arc.
Figure 10:
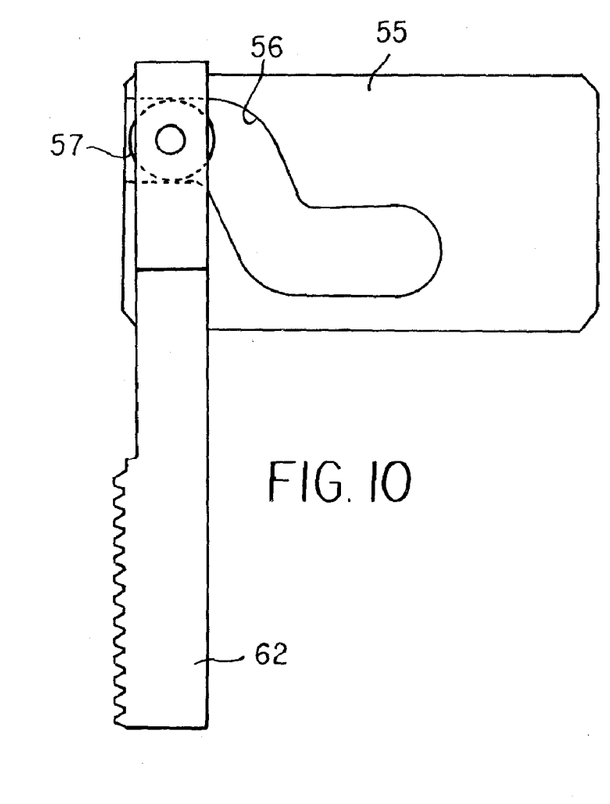

The opening movement of X plate 50 away from fixed A plate 20 as shown in FIGS. 7 and 8, operates a cam 55 that moves rack 62 upward as shown in FIGS. 7 and 8. Cam 55, illustrated in FIGS. 1, 9 and 10, has a cam slot 56 that is followed by a bearing 57. The raising of rack 62 rotates pinion 61 of pivoter 60, which pivots with rotation of pinion 61. This pivoting motion pivots lid closer 70 through an arc that closes and latches lids 33 against bodies 32. This completes the lid closing operation during the opening movement sequence of the mold plates.

Since the lid closing is accomplished mechanically by movements derived from movements of mold plates themselves, timing of these motions is cam controlled so that components cannot crash into each other. The same movements that close the lids are reversed when the mold plates move back to a closed position for another shot. Completing lid closures within the normal opening sequence of the mold avoids additional cycle time so that the mold can operate at its top speed. One example of a 48-cavity mold operating according to the invention has saved 5 seconds of cycle time from 16 seconds used to close lids by a separate mechanism, compared with 11 seconds for closing the lids during the mold opening sequence as explained above. This results in enormous savings for parts that must be mass produced.

What is claimed is:

1. A lid closing system for an injection mold making parts with bodies and lids connected by living hinges, the system comprising:
    a lid closer arranged within plates of the mold in a position that is spaced from the lids and aligned with a space behind the lids;
    an initial portion of opening movement of a plate of the mold being effective to move a core away from a position behind the lids of the molded parts while moving the lid closer into the behind-the-lids position;
    a subsequent portion of the opening movement of mold plates being effective to pivot the lid closer through an arc to close the lids to the bodies; and
    the closing of the lids being accomplished during the opening movement of the mold plates so that the lid closing does not add to a cycle time of the mold.

2. The lid closing system of claim 1 wherein a cam raises the lid closer into the behind-the-lids position.

3. The lid closing system of claim 1 wherein a cam driving a rack and pinion pivots the lid closer to close the lids.

4. The lid closing system of claim 3 wherein the pinion has an axis aligned with the living hinges.

5. The lid closing system of claim 1 wherein the lid closer and a pinion for pivoting the lid closer are arranged in an intermediate plate positioned between a fixed plate of the mold and a movable plate of the mold.

6. The lid closing system of claim 5 wherein the intermediate plate moves away from a fixed plate of the mold during the subsequent portion of the opening movement when a cam operates a rack that rotates the pinion to pivot the lid closer.

7. A method of closing lids of injection molded parts having bodies and lids connected by living hinges, the method comprising:
    arranging a lid closer within plates of the mold in a position that is aligned with a space behind the lids;
    using movement of a mold plate during an initial portion of a mold opening sequence to move a core away from the space behind the lids;
    using the initial portion of the mold opening sequence to move the lid closer into the space behind the lids;
    using a subsequent portion of the mold opening sequence to move the parts away from a fixed mold plate while pivoting the lid closer through an arc that closes the lids against the bases; and
    accomplishing the lid closer operation during the mold opening sequence so that lid closing does not add to mold cycle time.

8. The method of claim 7 including using a cam motion to move the lid closer into the space behind the lids.

9. The method of claim 7 including using a cam driving a rack and pinion to accomplish the pivoting of the lid closer.

10. The method of claim 9 wherein an axis of the pinion aligns with the living hinges.

11. The method of claim 7 including arranging the lid closer within an intermediate plate of the mold within which a movable cavity and a fixed cavity meet.

12. A lid closing system for an injection mold making parts with bodies and lids connected by living hinges so that the lids can latch to the bodies, the system comprising:
    a lid closer arranged within a plate of the mold;
    an initial portion of a mold opening sequence being effective to move a core away from a position behind the lids of the molded parts;
    the initial portion of the mold opening sequence also being effective to move the lid closer into the position behind the lids as the core moves away from the position behind the lids;
    a subsequent portion of the opening movement of the mold effectively moving the molded parts away from a stationary mold plate while pivoting the lid closer through an arc that latches the lids to the bodies; and
    accomplishing the lid closing during opening movement of plates of the mold so as not to increase mold cycle time.

13. The system of claim 12 wherein a cam moved by the initial plate movement effectively moves the lid closer into the behind-the-lids position.

14. The system of claim 12 wherein a cam moved by the subsequent opening movement drives a rack that rotates a pinion that pivots the lid closer through the arc.

15. The system of claim 12 wherein the living hinges are arranged in rows and the lid closer pivots on an axis aligned with the living hinges.

16. The system of claim 12 wherein the lid closer is arranged on an intermediate plate positioned between a movable cavity plate and a fixed cavity plate.

17. A combination arranged to close lids of injection molded parts with bodies and lids connected by living hinges, the combination comprising:
   an intermediate mold plate arranged between a movable cavity plate and a fixed cavity plate;
   the intermediate plate containing a lid closer and a pinion for pivoting the lid closer through an arc; and
   a mold opening sequence of plates of the mold being effective to:
      withdraw a core from behind molded lids,
      move the lid closer into a position behind the lids, and
      rotate the pinion to pivot the lid closer through an arc that closes the lids against the bodies, and
   all these movements being derived from mold plate movements to be completed without adding to a cycle time of the mold.

18. The combination of claim 17 including a cam moved by a movable mold plate to move the lid closer into the behind-the-lids position.

19. The combination of claim 17 including a cam arranged between the fixed plate and the intermediate plate to drive a rack that rotates the pinion that pivots the lid closer.

20. The combination of claim 17 wherein movable cavities for the parts meet with fixed cavities for the parts within the intermediate mold plate.

* * * * *